United States Patent
Joyce

(10) Patent No.: US 7,982,637 B2
(45) Date of Patent: Jul. 19, 2011

(54) DATA ENCODING METHOD

(76) Inventor: Stephen Allyn Joyce, Park Ridge, IL (US)

( * ) Notice: Subject to any disclaimer, the term of this patent is extended or adjusted under 35 U.S.C. 154(b) by 0 days.

(21) Appl. No.: 12/856,469

(22) Filed: Aug. 13, 2010

(65) Prior Publication Data

US 2011/0037625 A1 Feb. 17, 2011

Related U.S. Application Data

(60) Provisional application No. 61/234,191, filed on Aug. 14, 2009.

(51) Int. Cl.
*H03M 7/00* (2006.01)
(52) U.S. Cl. ............ 341/55; 715/264; 709/231; 341/50
(58) Field of Classification Search .................. 341/50, 341/55; 715/264, 265; 709/231
See application file for complete search history.

(56) References Cited

U.S. PATENT DOCUMENTS

| | | | |
|---|---|---|---|
| 5,819,283 A | 10/1998 | Tukowski | |
| 5,889,481 A | 3/1999 | Okada | |
| 6,166,666 A | 12/2000 | Kadyk | |
| 6,313,763 B1 * | 11/2001 | Lambert | 341/50 |
| 6,434,625 B1 | 8/2002 | Loen | |
| 7,394,411 B1 | 7/2008 | Inoue et al. | |
| 7,568,156 B1 * | 7/2009 | Fischer et al. | 715/256 |
| 7,627,479 B2 | 12/2009 | Travieso | |
| 7,636,885 B2 | 12/2009 | Merz et al. | |
| 2004/0177322 A1 | 9/2004 | Atkins | |
| 2006/0168130 A1 | 7/2006 | Cox | |
| 2007/0186005 A1 | 8/2007 | Setlur et al. | |
| 2008/0100623 A1 | 5/2008 | Gurcan et al. | |
| 2009/0003703 A1 * | 1/2009 | Zhang et al. | 382/181 |

OTHER PUBLICATIONS

SIL International, Peter Constable, Apr. 24, 2003, "Use of the Unicode Private Use Areas by Software Vendors", Internet URL: http://scripts.sil.org/VendorUseOfPUA.*
S. Josefson. IETF RFC 4648: The Base16, Base32, and Base64 Data Encodings [online]. The Internet Society, 2006. [retrieved on Aug. 11, 2008]Retrieved from the Internet: <URL: http://tools.ietf.org/rfc/rfc4648.txt>.
Bray, T. and Paoli, J. Extensible Markup Language (XML) 1.0 Fifth Edition [online]. World Wide Web Consortium, 2008. [retrieved on Aug. 11, 2008] Retrieved from the Internet: <URL: http://www.w3.org/TR/xml/>.

* cited by examiner

*Primary Examiner* — Howard Williams

(57) ABSTRACT

The present encoding method encodes binary data as sequences of code points occupying the Private Use Area of the Unicode Basic Multilingual Plane. The encoded data can be contained within a stream of UTF-8, UTF-16 or UTF-32 code units and subsequently decoded to yield the original binary data. This method requires minimal processing for both encoding and decoding operations, and yields a 75% storage efficiency limit. Each datum encoding sequence includes type and encoding length information, enhancing parse and search operation performance. The type system includes elements for creating complex structured data-text sequences, and a mechanism for application defined extensions.

20 Claims, 3 Drawing Sheets

| Size | Tag | Value | Code Point Sequence |
|---|---|---|---|
| 8-bit: | 0 | 12 | E012 |
| 16-bit: | A0 | 1234 | EA01, E234 |
| 32-bit: | 2 | 12345678 | E212, E345, E678 |
| 64-bit: | A2 | 123456789ABCDEF0 | EA21, E234, E567, E89A, EBCD, EEF0 |
| 128-bit: | 6 | 123456789ABCDEF0123456789ABCDEF0 | E612, E345, E678, E9AB, ECDE, EF01, E234, E567, E89A, EBCD, EEF0 |

Present encoding method for Unsigned Integers

```
Binary data (12 bits/code point):

5AF, C84, 3B7, 210, 9DE, 060 ...

Encoded data (leading zeros are significant):                                    Storage Efficiency:

UTF-8:    EE, 96, AF, EE, B2, 84, EE, 8E, B7, EE, 88, A0, EE, A3, 9E, EE, 81, A0 ...      50%

UTF-16:   E5AF, EC84, E3B7, E210, E9DE, E060 ...                                 75%

UTF-32:   0000E5AF, 0000EC84, 0000E3B7, 0000E210, 0000E9DE, 0000E060 ...        37.5%
```

Figure 1: Present encoding method for any binary data

```
Size      Tag    Value                              Code Point Sequence 8-bit:     0     12                                 E012

16-bit:    A0    1234                               EA01, E234

32-bit:    2     12345678                           E212, E345, E678

64-bit:    A2    123456789ABCDEF0                   EA21, E234, E567, E89A, EBCD, EEF0

128-bit:   6     123456789ABCDEF0123456789ABCDEF0

E612, E345, E678, E9A8, ECDE, EF01, E234, E567, E89A, EBCD, EEF0
```

Figure 2: Present encoding method for Unsigned Integers

```
10-byte data array:    12, 34, 56, 78, 9A, BC, DE, F0, 12, 34

Atom type tag:         A8     (fixed size numeric array)

Type size tag:         0      (8-bit unsigned integers)

Array size tag:        E00A   (Uns8 = 10 )

Code point sequence:   EA80, E00A, E123, E456, E789, EABC, EDEF, E012, E34z (z = zero padding)
```

Figure 3: Present encoding method for an Unsigned Byte Array

| | | |
|---|---|---|
| Encoded atoms: | UnsVP | 123456789 = EA60, E075, EBCD, E150 |
| | IntVP | − 123456789 = EA70, EF8A, E432, EEB0 |
| | FltVP | 9.0123 = EA80, E009, E05A, E4D0 |
| Atom type tag: | AC | (variable precision array) |
| Precision tag: | 0 | (32-bit precision) |
| Array length tag: | E003 | (Uns8 = 3) |
| Encoded array: | EAC0, E003, EA60, E075, EBCD, E150, EA70, EF8A, E432, EEB0, EA80, E009, E05A, E4D0 | |

Figure 4: Present encoding method for a 32-bit Variable Precision Numeric Array

| | | |
|---|---|---|
| Array contents: | 0042, 0041, 0044, 0043, 0057, 0044, 0045, DCEF | "BADCODE..." |
| | The array data contains an unmatched trailing surrogate: U+DCEF | |
| Atom type tag: | AD | (code units array) |
| Status flags tag: | 0 | (application defined) |
| Array length tag: | E008 | (Uns8 = 8) |
| Encoded atom: | EAD1, E008, 0042, 0041, 0044, 0043, 0057, 0044, 0045, DCEF | |

Figure 5: Present encoding method for a UTF-16 CodeArray Atom

| | | |
|---|---|---|
| Array contents: | E001, E002, E003, E004 | |
| Text type tag: | AE | (data codon array) |
| Status flags tag: | 0 | (application defined) |
| Codon count tag: | E004 | (Uns8 = 4) |
| Code point sequence: | EAE0, E004, E001, E002, E003, E004 | |
| UTF-8 encoding: | EE, AB, A0, EE, 80, 84, EE, 80, 81, EE, 80, 82, EE, 80, 83, EE, 80, 84 | |
| UTF-16 encoding: | EAE0, E004, E001, E002, E003, E004 | |

Figure 6: Present encoding method for a DataCode Array

| | | |
|---|---|---|
| 8 character array: | 42, 61, 73, 65, 33, 7A | "Base3z" |
| Text type tag: | AF | (text codon array) |
| Status flags tag: | 0 | (application defined) |
| Character count tag: | E006 | (Uns8 = 6) |
| Code point sequence: | EAF0, E006, 42, 61, 73, 65, 33, 7A, EAFF | |
| UTF-8 encoding: | EE, AB, B0, EE, 80, 86, 42, 61, 73, 65, 33, 7A, EE, AB, BF | |
| UTF-16 encoding: | EAF0, E006, 0042, 0061, 0073, 0065, 0033, 007A, EAFF | |

Figure 7: Present encoding method for a TextCode Array

| | |
|---|---|
| Decimal number: | -12,345,678.90 |
| BCD type tag: | B |
| Digit count tag: | 0C |
| Code point sequence: | EB0C, ED12, E345, E678, EF90 |
| | |
| Scientific number: | $3.4567890 \times 10^{-12}$ |
| BCD type tag: | B |
| Digit count tag: | 0D |
| Code point sequence: | EB0D, E3F4, E567, E890, EED1, E2BB |

Figure 8: Present encoding method for Decimal and Scientific Numbers

DATA ENCODING METHOD

CLAIM FOR PRIORITY

This application claims priority from U.S. Provisional Application Ser. No. 61/234,191 filed Aug. 14, 2009, the complete subject matter of which is incorporated herein by reference in its entirety.

FIELD OF THE INVENTION

The invention relates to a system and method for encoding data. More particularly, the invention relates to a system and method for encoding binary data as a sequence of Unicode character code points.

BACKGROUND OF THE INVENTION

Definitions

The formal definitions of terms as they are used herein are indicated by paragraphs indexed with [D] tags. These definitions apply throughout except where specifically noted otherwise.

[D1] A codon is a "well-formed" UTF-8, UTF-16 or UTF-32 encoding of a code point, as defined by the Unicode Standard [Unicode]. Exactly one codon of each encoding form is defined for every Unicode scalar value. Codons are not defined for surrogate code points. The codon identifier is the encoded code point value.

[D2] An atom is a sequence of codons of the same encoding form which encode an instance of the present encoding method data types according to the rules defined herein. The atom type is the encoded data type.

[D3] A codec is a device or program that encodes the present encoding method data types as atoms, or decodes atoms to the present encoding method data types.

[D4] A sequencer is a device or program that uses a codec to encode or decode sequences of atoms according to the rules defined herein. The codec may be part of the sequencer.

[D5] An application is a device or program that uses a codec or sequencer to encode or decode atoms. The codec or sequencer may be part of the application.

[D6] An error is the occurrence of a code unit, codon or atom sequence encoding or decoding failure during the operation of a codec, sequencer or application, as defined herein.

For the foregoing reasons, it would be desirable to have a system and method for encoding binary data as a sequence of Unicode character code points.

SUMMARY OF THE INVENTION

Present Encoding Method Data Types

The present encoding method is based upon a set of 31 data types, the encoding of each data type as an atomic sequence of codons, and the decoding of those atoms to the base data types. This section provides a formal specification of these data types and atom encodings using the EBNF style grammar defined later. The rules defining code point classes, data type constants and atom codon patterns are indexed with [A] tags. The rules defining atom type groupings are indexed with [G] tags.

The present invention provides an efficient method for encoding a binary data type as a sequence of one or more Unicode code points, said code points occupying a private use area of the Unicode Basic Multilingual Plane, using one or more bits of the first code point or points of each sequence as a tag identifying both the type and length of data encoded, and decoding said sequence back into binary data.

INTRODUCTION

The formats used for structured data storage and communication vary widely in processing efficiency, program reusability and user accessibility. Using device memory images directly maximizes processing efficiency, but provides minimal levels of reusability and accessibility. Byte-oriented plain text formats provide moderate to high reusability and accessibility levels with relatively low processing efficiencies. A common solution between these two extremes is to encode binary data as tagged text substrings inserted within plain text strings, resulting in "structured" text strings.

At the core of a tagged text encoding solution is the method used to convert logical and numeric information from binary data to text, and back to binary data. The text representation of the binary data can be classified broadly as either a presentation encoding or a transfer encoding. Presentation encodings apply locale and application defined formatting rules to produce a specific textual result, while transfer encodings are designed to produce a singular representation efficiently. The processing overhead for presentation encoding is generally very high compared with transfer encoding, and the difference is often greater for decoding operations due to the multiplicity of formatting options.

For example, printing 32-bit values to memory as formatted text using a typical Standard C Library sprintf( ) function can consume hundreds of processor instructions per value, and triples the storage size. Base 64 encoding [IETF RFC 4648] of the same values consumes about 20 processor instructions per value, and increases the storage size by only one-third. In principle, reducing and/or redistributing the processing of presentation formatted binary data can yield significant performance gains and cost reductions for devices and systems that process structured text extensively. The present encoding method is a technology for (re)engineering high performance products that require or benefit from structured text processing.

Embodiments of the present invention relate to a computer readable storage medium containing one or more instructions, which when executed by a computer performs encoding of at least one binary data value as a sequence of Unicode code points, the code points occupying the Private Use Area of the Unicode Basic Multilingual Plane; the encoding instructions using one or more bits of the first code point or code points of each sequence as an identification tag, each tag identifying both the type of data encoded and the length of the data encoded; the sequence mapping data values to code points using Big-Endian (BE) or Little-Endian (LE) bit ordering; and the encoding comprising one of the following the construction of a Unicode code point as the mathematical "OR" of the constant E000 hexadecimal with a 12-bit data value from 0 to FFF hexadecimal; the code points occupying the Unicode Basic Multilingual Plane in the range from E000 to EFFF hexadecimal; the decoding of the original data value as the Boolean "AND" of the code point with the constant FFF hexadecimal; or the construction of a Unicode code point as the mathematical "addition" of a fixed constant in the range E000 to E900 hexadecimal with a 12-bit data value from 0 to FFF hexadecimal; the code points occupying the Unicode Basic Multilingual Plane in the range from E000 to F8FF hexadecimal; the decoding of the original data value as the mathematical "subtraction" of the same fixed constant from the code point.

Other embodiments relate, to in a computer system, a computer readable storage medium containing one or more instructions for performing a method for character encoding and decoding: the method comprising translating a source data into a sequence of Unicode code points occupying the Private Use Area of the Unicode Basic Multilingual Plane, the method comprising: using one or more bits of the first code point or code points of each sequence as an identification tag, each tag identifying both the type of data encoded and the length of the data encoded; the encoding method comprising one of the following methods: the construction of a Unicode code point as the mathematical "OR" of the constant E000 hexadecimal with a 12-bit data value from 0 to FFF hexadecimal; the code points occupying the Unicode Basic Multilingual Plane in the range from E000 to EFFF hexadecimal; the decoding of the original data value as the Boolean "AND" of the code point with the constant FFF hexadecimal; or the construction of a Unicode code point as the mathematical "addition" of a fixed constant in the range E000 to E900 hexadecimal with a 12-bit data value from 0 to FFF hexadecimal; the code points occupying the Unicode Basic Multilingual Plane in the range from E000 to F8FF hexadecimal; the decoding of the original data value as the mathematical "subtraction" of the same fixed constant from the code point.

Yet another embodiment relates to, in a computer system, a method of encoding binary data as a sequence of Unicode code points occupying the Private Use Area of the Unicode Basic Multilingual Plane, the encoding comprising one of the following methods: the construction of a Unicode code point as the mathematical "OR" of the constant E000 hexadecimal with a 12-bit data value from 0 to FFF hexadecimal; the code points occupying the Unicode Basic Multilingual Plane in the range from E000 to EFFF hexadecimal; the decoding of the original data value as the Boolean "AND" of the code point with the constant FFF hexadecimal; or the construction of a Unicode code point as the mathematical "addition" of a fixed constant in the range E000 to E900 hexadecimal with a 12-bit data value from 0 to FFF hexadecimal; the code points occupying the Unicode Basic Multilingual Plane in the range from E000 to F8FF hexadecimal; the decoding of the original data value as the mathematical "subtraction" of the same fixed constant from the code point.

One or more embodiments are contemplated in which the tag identifies at least one of single 8, 16, 32, 64 and 128 bit signed and unsigned integers or arrays thereof; the tag identifies at least one of single 32, 64 and 128 binary and decimal floating point numbers or arrays thereof; the tag identifies at least one of UTF-8, UTF-16 or UTF-32 code units or arrays thereof; the tag identifies at least one of variable precision signed and unsigned integers, binary and decimal floating point numbers or arrays thereof; the tag identifies any of a binary code decimal string value, a bit-string (array), or binary data objects (blobs) of any content; and/or the tag identifies at least one of an enumerated constant value.

In one or more embodiments the enumerated constant value being one of a True, False or a user-defined value.

In one or more embodiment, the encoding and decoding is accomplished by one of a hardware or software codec.

In one or more embodiments, the sequence mapping data values to code points using Big-Endian (BE) or Little-Endian (LE) bit ordering.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

FIG. 1 depicts the present encoding method for any binary data

FIG. 2 depicts the present encoding method for Unsigned Integers

FIG. 3 depicts the present encoding method for an Unsigned Byte Array

FIG. 4 depicts the present encoding method for a 32-bit Variable Precision Numeric Array FIG. 5 depicts the present encoding method for a UTF-16 CodeArray Atom FIG. 6 depicts the present encoding method for a DataCode Array FIG. 7 depicts the present encoding method for a TextCode Array FIG. 8 depicts the present encoding method for Decimal and Scientific Numbers Throughout the various figures, like reference numbers refer to like elements.

DETAILED DESCRIPTION OF PRESENTLY PREFERRED EMBODIMENTS

Encoding

The Basic Multilingual Plane defined in the Unicode Standard contains a block of code points from U+E000 to U+F8FF, permanently reserved for the private use of any application, known as the "private-use area." The Unicode Standard does not define characters for these code points, allowing each to represent numerical data, text characters or other information. The first section of this block is the set of 4096 code points from U+E000 to U+EFFF, referred to here as the "E-block" for brevity.

Note: A discussion of the technical merits of this code point block is provided later.

The most basic aspect of the present encoding method is the mapping of any binary data set into a sequence of one or more E-block code points defined as the Boolean OR of the constant 0xE000 with a 12-bit data value from 0 to 0xFFF. The decode operation extracts the original data value as the Boolean AND of the code point with the constant 0x0FFF. The encoding of binary data as UTF-8, UTF-16 and UTF-32 code units is illustrated in FIG. 1.

None of the common binary data sizes in use today: 8-bits, 16-bits, 32-bits, 64-bits and 128-bits are a multiple of 12, which leaves unused encoding bits when single data values are processed. For example, encoding a 32-bit value requires 3 E-block code points, leaving 4 unused bits. Encoding a 64-bit value leaves 8 unused bits from 6 E-block code points. Data arrays and structures do not often measure a multiple of 12-bits in size, generally leaving unused bits in the last code point.

A key aspect of the present encoding method is the use of these unused encoding bits in a systematic manner to specify data type and size information in each scalar value or binary data array encoding. The first code point in a scalar value encoding sequence begins with a 4-bit or 8-bit "tag" that specifies the data type, followed by the initial data bits of the value. The remaining data bits occupy additional code points as required for each supported data type, leaving no unused encoding bits for 8, 16, 32, 64 or 128 bit scalar data values. The encoding of the unsigned integer types is illustrated in FIG. 2.

Variable precision types and array types use addition tag bits and code points as required to indicate both the type and size of the encoding. An important result of tagging all encoded data with type and size bits is the ability to quickly scan past individual encoded items within a code unit stream using the tag information to determine the encoding length of each item. Fixed precision types such as integer and floating point values have constant encoding lengths specific to each Unicode encoding form. The encoding length of variable precision and array types can be derived using simple formulas.

Design Features

The present encoding method was originally developed as an extension to the W3C Extensible Markup Language (XML) [W3C XML 1.0] for use in application configuration, messaging and logging operations. The project goal was to create an efficient text encoding for the numeric attribute values and content of XML document elements. As the project evolved, the performance limitations of using XML as a structured data format led to a new goal: create a simple and efficient structured data-text technology for use in performance sensitive applications.

Key design features provided by the present encoding method are as follows:

Unicode Compatible

The encodings are compatible with the Unicode Standard, using the UTF-8, UTF-16 and UTF-32 encoding forms.

Wide Application Range

The encoding supports all common binary data types, and provides an extensible system of type tags for building structured data-text applications.

High Performance

The encoding has a limiting spatial efficiency of 75% using the UTF-16 form, and a limiting efficiency of 50% using the UTF-8 form.

The processing overhead is minimal and the encoding can be implemented as a data load and store format by data processing hardware.

Minimal Complexity

The encoding and decoding is simple to implement using a regular and compact design that is fully compliant with this specification.

User Accessible

The encoded data is easy to identify within text streams, and manual encoding or decoding is possible by hexadecimal adept persons.

Data Types

Code Point Classes

The code point set is identical to the code point set defined in the Unicode Standard.

All code points are classified by the present encoding method as text, surrogate or data code points.

[A1] CodePoint:=[U+0000–U+10FFFF]

All code points excluding the E-block and UTF-16 surrogate blocks are text code points.

[A2] TextCode:=[U+0000–U+D7FF]|[U+F000–U+10FFFD]

UTF-16 surrogate code points are members of either the leading or trailing surrogate block.

The first code point value of each block is the class identifier constant for that block.

[A3] ZLeading:=U+D800
[A4] LeadingCode:=[ZLeading–U+DBFF]
[A5] ZTrailing:=U+DC00
[A6] TrailingCode:=[ZTrailing–U+DFFF]

The E-block code points are used exclusively for encoding binary data.

The first code point value of this block is the class identifier for that block.

[A7] ZData:=U+E000
[A8] DataCode:=[ZData–U+EFFF]

The remaining Basic Multilingual Plane private-use area from U+F000 to U+F8FF is classified as "private" text reserved for application specific use.

Applications that have previously defined uses for E-block code points must migrate those code points to this alternate private code point range to be compatible with the present encoding method.

The first code point value of this block is the class identifier for the block.

[A9] ZPrivate:=U+F000
[A10] PrivateCode:=[ZPrivate–U+F8FF]

A Unicode scalar value is either a "text" or "data" code point.

[A11] ScalarValue:=TextCode|DataCode

Atom Starting Codons

The starting codon of an atom is always a DataCode or E-block code point with a 1 or 2 nibble type tag following the high order 'E' nibble. Zero or more additional codons encode the remainder of the atom. The code points of all atom starting codons are organized in Table 1.

The left-most column indicates the common E-block code point nibbles for the atom type or types in each row. Nibbles marked "x" encode data, nibbles marked "n" encode array size information, and nibbles marked "s" encode the size of variable precision numeric elements.

TABLE 1

Present encoding method Atom Starting Codons

| | | | | | | | | |
|---|---|---|---|---|---|---|---|---|
| E0xx | Uns8 | Uns8 | Uns8 | Uns8 | Uns8 | Uns8 | Uns8 | Uns8 |
| E1xx | Int8 | Int8 | Int8 | Int8 | Int8 | Int8 | Int8 | Int8 |
| E2xx | Uns32 | Uns32 | Uns32 | Uns32 | Uns32 | Uns32 | Uns32 | Uns32 |
| E3xx | Int32 | Int32 | Int32 | Int32 | Int32 | Int32 | Int32 | Int32 |
| E4xx | Flt32 | Flt32 | Flt32 | Flt32 | Flt32 | Flt32 | Flt32 | Flt32 |
| E5xx | Dec32 | Dec32 | Dec32 | Dec32 | Dec32 | Dec32 | Dec32 | Dec32 |
| E6xx | Uns128 | Uns128 | Uns128 | Uns128 | Uns128 | Uns128 | Uns128 | Uns128 |
| E7xx | Int128 | Int128 | Int128 | Int128 | Int128 | Int128 | Int128 | Int128 |
| E8xx | Flt128 | Flt128 | Flt128 | Flt128 | Flt128 | Flt128 | Flt128 | Flt128 |
| E9xx | Dec128 | Dec128 | Dec128 | Dec128 | Dec128 | Dec128 | Dec128 | Dec128 |
| EA... | Uns16 | Int16 | Uns64 | Int64 | Flt64 | Dec64 | UnsVP | IntVP |
| | EA0x | EA1x | EA2x | EA3x | EA4x | EA5x | EA6s | EA7n |
| EBss | BCD | BCD | BCD | BCD | BCD | BCD | BCD | BCD |
| ECxx | Enum | Enum | Enum | Enum | Enum | Enum | Enum | Enum |
| EDxx | Enum | Enum | Enum | Enum | Enum | Enum | Enum | Enum |

TABLE 1-continued

| | Present encoding method Atom Starting Codons | | | | | | | |
|---|---|---|---|---|---|---|---|---|
| EExx | User | User | User | User | User | User | User | User |
| EFxx | User | User | User | User | User | User | User | User |
| E0xx | Uns8 | Uns8 | Uns8 | Uns8 | Uns8 | Uns8 | Uns8 | Uns8 |
| E1xx | Int8 | Int8 | Int8 | Int8 | Int8 | Int8 | Int8 | Int8 |
| E2xx | Uns32 | Uns32 | Uns32 | Uns32 | Uns32 | Uns32 | Uns32 | Uns32 |
| E3xx | Int32 | Int32 | Int32 | Int32 | Int32 | Int32 | Int32 | Int32 |
| E4xx | Flt32 | Flt32 | Flt32 | Flt32 | Flt32 | Flt32 | Flt32 | Flt32 |
| E5xx | Dec32 | Dec32 | Dec32 | Dec32 | Dec32 | Dec32 | Dec32 | Dec32 |
| E6xx | Uns128 | Uns128 | Uns128 | Uns128 | Uns128 | Uns128 | Uns128 | Uns128 |
| E7xx | Int128 | Int128 | Int128 | Int128 | Int128 | Int128 | Int128 | Int128 |
| E8xx | Flt128 | Flt128 | Flt128 | Flt128 | Flt128 | Flt128 | Flt128 | Flt128 |
| E9xx | Dec128 | Dec128 | Dec128 | Dec128 | Dec128 | Dec128 | Dec128 | Dec128 |
| EA... | FltVP | DecVP | Bits[ ] | Num[ ] | VP[ ] | Code[ ] | Data[ ] | Text[ ] |
| | EA8s | EA9s | EAAs | EABs | EACs | EADs | EAEs | EAFs |
| EBss | BCD | BCD | BCD | BCD | BCD | BCD | BCD | BCD |
| ECxx | Enum | Enum | Enum | Enum | Enum | Enum | Enum | Enum |
| EDxx | Enum | Enum | Enum | Enum | Enum | Enum | Enum | Enum |
| EExx | User | User | User | User | User | User | User | User |
| EFxx | User | User | User | User | User | User | User | User |

The row starting with "EA." contains the 16 atom types with 2-nibble type tags in the starting codon, each in the range [0xA0-0xAF]. Type constants for all the data types are formed by substituting zeros for the nibbles marked as "x" or "n" or "s" in the starting codon of each type. Alternative assignments of the data types to the rows and columns of Table 1 are possible, and may be included in future embodiments of the present encoding method.

Atom Encoding Lengths

Atom encoding lengths are measured in codons and in code units. The abstract codon length is the number of code points specified by the atom encoding rules. The physical code unit length is a function of the atom codon length and the codon encoding form. The lengths of all the atom types are summarized in Table 2.

Fixed precision, enumerated and user defined types have constant lengths, while variable precision and array type lengths are functions of the data type and number of elements.

All atom types except the CodeArray and TextArray are encoded using only DataCode (E-block) codons. The code unit length of these atoms is equal to the codon length using UTF-16 or UTF-32 codons, and is 3 times that value using UTF-8 codons. These constant relationships enable very efficient storage calculations and search operations for sequences of these atoms.

A TextArray atom encapsulates an array of TextCode (non E-block) code points. The code unit length of each TextCode codon is a function of both its code point value and its encoding form. The UTF-32 code unit length is 1 for all TextCode values. The UTF-16 code unit length is 1 for all BMP code points, and 2 for all higher plane values. The UTF-8 code unit length is 1, 2 or 3 for BMP code points, and 4 for all higher plane values. In general, only the minimum UTF-8 or UTF-16 code unit length of TextArray atoms can be determined without scanning the atom content.

Atom Encoding and Byte Ordering

The encoding of a scalar binary data type maps data value nibbles to code point (codon) nibbles in big-endian order using the preferred embodiment of the present encoding method. This mapping choice allows encoded integers of the same type to be sorted directly "as text" without decoding, alone or mixed within a free TextCode sequence. Alternative data to code point mappings, including little-endian order may, be included in a future embodiment of the present encoding method specification if needed and such is contemplated as being within the scope of the present method.

The present method for encodings of variable precision and array types map the nibbles of each data element to code point nibbles in big-endian order, and encode these elements in array index ascending order.

TABLE 2

| Present encoding method Atom Encoding Lengths | | |
|---|---|---|
| Fixed Precision | Int8, Uns8 | 1 data codon |
| | Int16, Uns16 | 2 data codons |
| | Dec32, Flt32, Int32, Uns32 | 3 data codons |
| | Dec64, Flt64, Int64, Uns64 | 6 data codons |
| | Dec128, Flt128, Int128, | 11 data codons |
| Variable | UnsVP, IntVP, FltVP, | $1 + 4S - 4S/3$ data codons |
| S = 32-bit words | BCD | $1 + (\text{digits} + 2)/3$ data codons |
| Arrays | BitArray | $2|3|4 + (N + 11)/12$ data codons |
| N = array size | NumericArray | $2|3|4 + N * S - N * S/3$ data codons |
| S = type byte | VariableArray | $2|3|4 + N(1 + (4S - 4S/3))$ data codons |
| | CodeArray | $2|3|4$ data codons + N UTF-8|16|32 code units |
| | DataArray | $2|3|4 + N$ data codons |
| | TextArray | $2|3|4$ data codons + N text codons + 1 data |
| Enumerated | Enum | 1 data codon |
| User Defined | User | 1 data codon |

This logical data-nibble to codon-nibble mapping is independent of the physical byte ordering of a given UTF-16 or UTF-32 code unit stream.

Byte Order Marking

The successful decoding of a byte stream as a sequence of Unicode scalar values requires knowing the Unicode encoding scheme used to produce the byte stream. The UTF-16 and UTF-32 encoding forms have multiple schemes based upon the physical byte ordering used; either big-endian or little-endian. The Unicode Standard provides guidelines for using the U+FEFF code point as a "byte order mark" (BOM) for determining the apparent physical byte ordering of a code unit sequence. The byte order of this code point will be {0xFE, 0xFF} when big-endian schemes are used, and {0xFF, 0xFE} otherwise. When the U+FEFF code point is encoded and then decoded using opposite-endian schemes, the decode operation produces the reserved code point U=FFFE, indicating the byte swap error.

[A12] ZNative:=U+FEFF
[A13] ZSwapped:=U+FFFE

Invalid Code Points

The Unicode Standard provides guidelines for handling ill-formed code unit sub-sequences by substituting one or more "replacement" characters for the erroneous data in the converted code point output sequence.

This is the preferred method when decoding the text content of TextArray atoms, or "free" text character sequences.

[A14] ZReplace:=U+FFFD

Fixed Precision Numeric Atoms

Fixed precision numeric atoms encode 8-bit, 16-bit, 32-bit, 64-bit or 128-bit signed integers, unsigned integers, or IEEE 754-2008 binary or decimal floating-point numbers [IEEE STD 754].

8-bit Numeric Values

A single 8-bit numeric value is encoded as a single Data-Code codon atom containing a 1-nibble type tag 0 or 1, followed by the 2 data nibbles "xx" in big-endian order. The data type constants and codon pattern rules for these atom types are as follows:

8-bit Unsigned Integers:
[A15] ZUns8:=U+E000
[A16] Uns8:=U+E0xx
8-bit Signed Integers:
[A17] ZInt8:=U+E100
[A18] Int8:=U+E1xx 16-bit Numeric Values A single 16-bit numeric value is encoded as a 2 DataCode codon atom containing a 2-nibble type tag of 0xA0 or 0xA1, followed by the 4 data nibbles "x xxx" in big-endian order. The data type constants and codon pattern rules for these atom types are as follows:

16-bit Unsigned Integers:
[A19] ZUns16:=U+EA00
[A20] Uns16:=U+EA0x U+Exxx
16-bit Signed Integers:
[A21] ZInt16:=U+EA10
[A22] Int16:=U+EA1x U+Exxx 32-bit Numeric Values A single 32-bit numeric value is encoded as a 3 DataCode codon atom containing a 1-nibble type tag of 2, 3, 4 or 5, followed by the 8 data nibbles "xx xxx . . ." in big-endian order. The data type constants and codon pattern rules for these atom types are as follows:

32-bit Unsigned Integers:
[A23] ZUns32:=U+E200
[A24] Uns32:=U+E2xx U+Exxx{2}
32-bit Signed Integers:
[A25] ZInt32:=U+E300
[A26] Int32:=U+E3xx U+Exxx{2}
32-bit Binary Floating Point Numbers:
[A27] ZFlt32:=U+E400
[A28] Flt32:=U+E4xx U+Exxx{2}
32-bit Decimal Floating Point Numbers:
[A29] ZDec32:=U+E500
[A30] Dec32:=U+E5xx U+Exxx{2}

64-bit Numeric Values

A single 64-bit numeric value is encoded as a 6 DataCode codon atom containing a 2-nibble type tag of 0xA2, 0xA3, 0xA4 or 0xA5, followed by the 16 data nibbles "x xxx . . ." in big-endian order. The data type constants and codon pattern rules for these atom types are as follows:

64-bit Unsigned Integers:
[A31] ZUns64:=U+EA20
[A32] Uns64:=U+EA2x U+Exxx{5}
64-bit Signed Integers:
[A33] ZInt64:=U+EA30
[A34] Int64:=U+EA3x U+Exxx{5}
64-bit Binary Floating Point Numbers:
[A35] ZFlt64:=U+EA40
[A36] Flt64:=U+EA4x U+Exxx{5}
64-bit Decimal Floating Point Numbers:
[A37] ZDec64:=U+EA50
[A38] Dec64:=U+EA5x U+Exxx{5}

128-bit Numeric Values

A single 128-bit numeric value is encoded as an 11 DataCode codon atom containing a 1-nibble type tag of 6, 7, 8 or 9, followed by the 32 data nibbles "xx xxx . . ." in big-endian order. The data type constants and codon pattern rules for these atom types are as follows:

128-bit Unsigned Integers:
[A39] ZUns128:=U+E600
[A40] Uns128:=U+E6xx U+Exxx{10} [0088] 128-bit Signed Integers:
[A41] ZInt128:=U+E700
[A42] Int128:=U+E7xx U+Exxx{10}
128-bit Binary Floating Point Numbers:
[A43] ZFlt128:=U+E800
[A44] Flt128:=U+E8xx U+Exxx{10}
128-bit Decimal Floating Point Numbers:
[A45] ZDec128:=U+E900
[A46] Dec 128:=U+E9xx U+Exxx{10}

Fixed Precision Numeric Atom Groups

The fixed precision numeric atom groups are:
[G1] Unsigned:=Uns8|Uns16|Uns32|Uns64|Uns128|Uns256
[G2] Integer:=Int8|Int16|Int32|Int64|Int128|Int256
[G3] Float:=Flt32|Flt64|Flt128|Flt256
[G4] Decimal:=Dec32|Dec64|Dec128|Dec256
[G5] FixedPrecision:=Unsigned|Integer|Float|Decimal Variable Precision Numeric Atoms A variable precision numeric atom encodes an integer or floating point value using a multiple of 32 bits of data precision S, for 32 to 512 bit numbers. The atom starting codon contains a 2-nibble type tag of 0xA6, 0xA7, 0xA8 or 0xA9 and a nibble precision multiple "s" equal to S−1, followed by 8*S data nibbles "xxx-xxx-xx . . ." in big-endian order.

The codon length L of a variable precision atom for the 32-bit precision multiple S from 1 to 16 is:

L=1+(4S−4S/3) . . . using integer division, resulting in atom lengths of 4 to 44 codons for 32 to 512-bit precisions, as follows:

4, 7, 9, 12, 15, 17, 20, 23, 25, 28, 31, 33, 36, 39, 41, 44

Unused bits in the last codon are set to zero, which occur in the following pattern of "encoded.unused" codon bits over the precision range:

32.4, 64.8, 96.0, 128.4, 160.8, 192.0 . . . 448.8, 480.0 and 512.4

The data type constants and codon pattern rules for these atom types are as follows:

Variable Precision Unsigned Integers:
[A47] ZUnsVP:=U+EA60
[A48] UnsVP:=U+EA6s U+Exxx{4S−4S/3}
Variable Precision Signed Integers:
[A49] ZIntVP:=U+EA70
[A50] IntVP:=U+EA7s U1+Exxx{4S−4S/3}
Variable Precision Binary Floating Point Numbers:
[A51] ZFltVP:=U+EA80
[A52] FltVP:=U+EA8s U+Exxx{4S−4S/3}
Variable Precision Decimal Floating Point Numbers:
[A53] ZDecVP:=U+EA90
[A54] DecVP:=U+EA9s U+Exxx{4S−4S/3}
Variable Precision Atom Group
The variable precision atom group is:
[G6] VariablePrecision:=UnsVP|IntVP|FltVP|DecVP Bit Array Atoms A BitArray atom encodes a bit vector of size N, from 0 to 0xFFFFFFFF. The atom consists of a starting codon containing the 2-nibble type tag 0xAA and a nibble "s" reserved for application defined status bits, followed by an Uns8, Uns16 or Uns32 atom encoding of N, followed by a sequence of (N+11)/12 DataCode codons containing the bits "bbbbbbbbbbbb, . . . " in ascending array index order. The minimum possible number of codons is used to encode the array data, which is left justified in the codon sequence. Unused bits in the last data codon are set to zero.

The data type constant and codon pattern rule for this atom type are:
[A55] ZBitArray:=U+EAA0
[A56] BitArray:=U+EAAs (Uns8|Uns16|Uns32) U+Ebbbbbbbbbbbb{(N+11)/12}

Fixed Precision Numeric Array Atoms

A fixed precision numeric array atom encodes an 8-bit, 16-bit, 32-bit, 64-bit or 128-bit integer or floating point number vector of size N, from 0 to 0xFFFFFFFF. The atom consists of a starting codon containing a 2-nibble numeric type tag 0xAB and a nibble "s" indicating the element type-size, followed by an Uns8, Uns16 or Uns32 atom encoding of N, followed by a sequence of DataCode codons containing the data nibbles "xxx . . . " encoded in big-endian order. The array elements are encoded in ascending index order.

The type-size nibble enumerates one of the 16 fixed precision numeric data types, and specifies an array element word size equal to the corresponding numeric type. For any word size of S-bytes, the atom encodes 3 data bytes (6 nibbles) in every 2 DataCode codons. The codon length L of any fixed precision data array atom of N elements is:

L=2|3|4+(S*N−S*N/3) . . . using integer division.

The minimum possible number of codons is used to encode the data words, which are left justified in the codon sequence. Any unused nibbles in the last codon are set to zero. The encoding of a byte array is illustrated in FIG. 3.

The data type constants and codon pattern rules for these atom types are:

8-bit Numeric Arrays
[A57] ZUns8Array:=U+EAB0
[A58] Uns8Array:=ZUns8Array (Uns8|Uns16|Uns32) U+Exxx{N−N/3}
[A59] ZInt8Array:=U+EAB1
[A60] Int8Array:=ZInt8Array (Uns8|Uns16|Uns32) U+Exxx{2N−N/3}

16-bit Numeric Arrays
[A61] ZUns16Array:=U+EAB2
[A62] Uns16Array:=ZUns16Array (Uns8|Uns16|Uns32) U+Exxx{2N−2N/3}
[A63] ZInt16Array:=U+EAB3
[A64] Int16Array:=ZInt16Array (Uns8|Uns16|Uns32) U+Exxx{2N−2N/3}

32-bit Numeric Arrays
[A65] ZUns32Array:=U+EAB4
[A66] Uns32Array:=ZUns32Array (Uns8|Uns16|Uns32) U+Exxx{4N−4N/3}
[A67] ZInt32Array:=U+EAB5
[A68] Int32Array:=ZInt32Array (Uns8|Uns16|Uns32) U+Exxx{4N−4N/3}
[A69] ZFlt32Array:=U+EAB6
[A70] Flt32Array:=ZFlt32Array (Uns8|Uns16|Uns32) U+Exxx{4N−4N/3}
[A71] ZDec32Array:=U+EAB7
[A72] Dec32Array:=ZDec32Array (Uns8|Uns16|Uns32) U+Exxx{4N−4N/3}

64-bit Numeric Arrays
[A73] ZUns64Array:=U+EAB8
[A74] Uns64Array:=ZUns64Array (Uns8|Uns16|Uns32) U+Exxx{8N−8N/3}
[A75] ZInt64Array:=U+EAB9
[A76] Int64Array:=ZInt64Array (Uns8|Uns16|Uns32) U+Exxx{8N−8N/3}
[A77] ZFlt64Array:=U+EABA
[A78] Flt64Array:=ZFlt64Array (Uns8|Uns16|Uns32) U+Exxx{8N−8N/3}
[A79] ZDec64Array:=U+EABB
[A80] Dec64Array:=ZDec64Array (Uns8|Uns16|Uns32) U+Exxx{8N−8N/3}

128-bit Numeric Arrays
[A81] ZUns128Array:=U+EABC
[A82] Uns128Array:=ZUns128Array(Uns8|Uns16|Uns32) U+Exxx{16N−16N/3}
[A83] ZInt128Array:=U+EABD
[A84] Int128Array:=ZInt128Array (Uns8|Uns16|Uns32) U+Exxx{16N−16N/3}
[A85] ZFlt128Array:=U+EABE
[A86] Flt128Array:=ZFlt128Array (Uns8|Uns16|Uns32) U+Exxx{16N−16N/3}
[A87] ZDec128Array:=U+EABF
[A88] Dec128Array:=ZDec128Array (Uns8|Uns16| Uns32) U+Exxx{16N−16N/3}

Fixed Precision Numeric Array Groups

The fixed precision numeric array atom groups are:
[G7] Num8Array:=Uns8Array|Int8Array
[G8] Num16Array:=Uns16Array|Int16Array
[G9] Num32Array:=Uns32Array|Int32Array|Flt32Array| Dec32Array
[G10] Num64Array:=Uns64Array|Int64Array|Flt64 Array|Dec64Array
[G11] Num128Array:=Uns128Array|Int128Array|Flt128 Array|Dec128Array
[G12] NumericArray:=Num8Array|Num16Array|Num32 Array|Num64Array|Num128Array Variable Precision Numeric Array Atoms A variable precision numeric array atom encodes a vector of size N, from 0 to 0xFFFFFFFF numeric atoms with a 32-bit precision multiple S. The atom consists of a starting codon containing a 2-nibble numeric type tag 0xAC and a nibble precision multiple "s" equal to S−1, followed by an Uns8, Uns16 or Uns32 atom encoding of N, followed by a sequence of data atoms. Each array element can be an integer or floating point atom of the same precision specified in the array starting codon. The elements are encoded in ascending index order aligned on codon boundaries as distinct atoms.

The codon length L of each variable precision atom for the 32-bit precision multiple S from 1 to 16 is:

L=1+(4S−4S/3) . . . using integer division, resulting in atom lengths of 4 to 44 codons for 32 to 512-bit precisions. The length of a variable precision array atom of precision S and size N is:

L*=2|3|4+N(1+(4S−4S/3)) data codons . . . using integer division.

The encoding of a 32-bit precision element array is illustrated in FIG. 4.

The data type constants and codon pattern rules for these atom types are:

[A89] ZVariableArray:=U+EAC0
[A90] VariableArray:=U+EACs (Uns8|Uns16|Uns32) U+Exxx{((3+8S)N+2)/3}

Code Unit Array Atoms

A CodeArray atom encapsulates an arbitrary array of UTF-8, UTF-16 or UTF-32 code units, of size N from 0 to 0xFFFFFFFF code units. The atom consists of a starting codon containing a 2-nibble type tag 0xAD and a nibble "s" reserved for application defined status bits, followed by an Uns8, Uns16 or Uns32 atom encoding of N, followed by the N code units. The array can include ill-formed code unit sequences. Examples of CodeArray atom encodings are illustrated in FIG. 5.

The data type constants and codon pattern rules for this atom are:

[A91] ZCodeArray:=U+EAD0
[A92] CodeArray:=U+EADs (Uns8|Uns16|Uns32) (utf8{N}|utf16{N}|utf32{N})

The content of a codon array is not required to be validated by a codec; however, a sequencer or application may "open" the array and attempt to decode the interior. This feature of a codon array allows applications to mark and safely package damaged or otherwise invalid atom encodings.

DataCode Array Atoms

A DataArray atom encodes a DataCode codon sequence of length N, of 0 to 0xFFFFFFFF. The atom consists of a starting codon containing a 2-nibble type tag 0xAE and a nibble "s" reserved for application defined status bits, followed by an Uns8, Uns16 or Uns32 atom encoding of N, followed by the N DataCode codons. The encoding of a DataArray atom is illustrated in FIG. 6.

The data type constant and codon pattern rule for this atom type are:

[A93] ZDataArray:=U+EAE0
[A94] DataArray:=U+EAEs (Uns8|Uns16|Uns32) DataCode{N}

The interpretation of the decoded array elements is application defined. An element sequence can encode a standard atom type or a custom information type. Enum or User atoms can prefix DataArray atoms to specify the expected processing of the array.

TextCode Array Atoms

A TextArray atom encodes a TextCode codon array of size N, where N ranges from 0 to 0xFFFFFFFF. The atom consists of a starting codon containing a 2-nibble type tag 0xAF and a "nibble "s" reserved for application defined status bits, followed by the N TextCode codons, and terminated with the data codon U+EAFF. The encoding of a TextArray atom is illustrated in FIG. 7.

The data type constant and codon pattern rule for this atom type are:

[A95] ZTextArray:=U+EAF0
[A96] ZTextStart:=[U+EAF0, U+EAFE]
[A97] ZTextStop:=U+EAFF
[A98] TextArray:=ZTextStart (Uns8|Uns16|Uns32) TextCode{N} ZTextStop A codec or sequencer can enhance the search for the end of a text array atom of size N by skipping to the N'th code unit following the start codons, synchronizing to the first TextCode codon and finding the terminator codon. The use of a non-TextCode codon to terminate a TextArray allows multiple NULL terminated strings to be encoded in a single atom.

Free Text

All TextCode codons not encapsulated as a TextArray atom are "free" text. These codons are processed by a codec as individual Text atoms. Applications may mix atoms with free text in the same codon stream unambiguously if E-block code points are used only to encode atoms.

Text Atom Group

[G13] Text:=TextCode|TextArray

Array Atom Size Encoding

Array atom sizes can be encoded as Uns8, Uns16 or Uns32 atoms as needed to contain the size value. The available memory and supported array size limits of codecs and applications are expected to vary with device resource constraints and application requirements.

BCD Digit String Atoms

A BCD atom encodes a binary coded decimal digit string of size N from 0 to 0xFF. The atom is encoded as a starting codon containing a nibble type tag 0xEB and a 2-nibble size "nn" equal to N, followed by (N+2)/3 DataCode codons containing N digits "ddd . . . " from the symbol set in Table 3.

The data encoding consists of an optional leading sign symbol, a real number with a whole or a fractional part indicated by a leading decimal point symbol or both, and an optional signed base 10 exponent. The real number and exponent are encoded in big-endian order.

The minimum possible number of codons is used to encode the digits and symbols, which are left-justified in the codon sequence and padded with trailing "blank" nibbles as needed in the last codon. The atom length ranges from 1 to 86 codons. The encoding of these atoms is illustrated in FIG. 8.

TABLE 3

Decimal Number and Symbol Set

| Nibble | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Digits | 0 | 1 | 2 | 3 | 4 | 5 | 6 | 7 | 8 | 9 | | reserved | | | | * |
| Symbol | | | | | Decimal point | | | | | | | | | | . | |
| | | | | | Base 10 exponent | | | | | | | | | e | | |
| | | | | | Plus, minus signs | | | | | | | | | + | − | |
| | | | | | Trailing blank | | | | | | | | | — | | |

The data type constant and codon pattern rule for this atom type are:

[A99] ZBCD:=U+EB00
[A100] BCD:=U+EBnn U+Eddd{(N+2)/3}

The encoding of a decimal digit string does not contain locale or formatting information. The explicit use of a + sign for the number or the exponent confirms what is otherwise assumed.

Enumerated Atoms

Enumerated atoms are single DataCode codons that represent mathematic and system constants, or prefix other atoms to "compound" their meaning and to create complex structured atom sequences. An enumerated atom can be identified by its code point value. The set of Enum atoms specified for this version of the present encoding method protocol are defined in Section 0.

The data type constant and codon pattern rule for this atom type are:

[A101] ZEnum:=U+EC00
[A102] Enum:=[U+EC00–U+EDFF]

User Defined Atoms

User defined atoms are enumerated single DataCode codons that can be used alone or in sequence with other atoms to define application specific information encodings, subject to the rules defined in this document. Innovations developed from applications using these atoms are expected to shape future Enum atom definitions.

The data type constant and codon pattern rule for this atom type are:

[A103] ZUser:=U+EE00
[A104] User:=[U+EE00–U+EFFF]

Atoms Group

The pattern rule for the atoms group is:
[G14] ZAtom:=FixedPrecision|VariablePrecision|BitArray|NumericArray|ariableArray|=CodeArray|DataArray|Text|BCD|Enum|User Enumerated Constant and Prefix Atoms Constant atoms are enumerated atoms that represent mathematical constants, physical constants or other "stand-alone" values. A small number of these atoms may be defined in the future based upon user experience and innovation and such is contemplated as being within the scope of the present method.

Prefix atoms are enumerated atoms that "bind" with other atoms to form specific atom sequences used to represent complex information as structured data-text strings. This section provides a formal specification of each prefix atom using the EBNF style grammar defined later.

Atom enumeration rules are indexed with hexadecimal [E] tags starting at zero as an aide to tracking the enumeration of new atoms. Undefined Enum atoms are reserved for future definition based upon user experience and innovation and such is contemplated as being within the scope of the present method. Sequence rules for these atoms are indexed with [S] tags.

Atom Sequences

Every atom sequence is structured by the atom types and ordering of the sequence. This apparent structure is defined by the sequencer and application logic used to encode or decode the sequence. The most efficient exchange of structured text encoded information among devices and programs is achieved when there is no schema processing overhead, as application data is encoded directly to text. Simple dedicated systems might be constructed in this manner.

Larger system designs generally benefit from the incorporation of some application schema elements into the protocols and formats used for information exchanges. Many contemporary industry standard systems are based upon the exchange of explicitly structured text encoded information that exposes a complex application schema. Prefix atom sequences provide the framework for incorporating an application schema into the structure of atom sequences.

The following atom sequence type definitions are useful:
[D7] A free atom sequence contains no prefix atoms, and therefore no atom sequencing rules apply to this general sequence type.
[D8] A primary atom sequence is a sequence defined by the sequencing rules for a single prefix atom. Each prefix atom defines at least one specific sequence type.
[D9] A well-formed atom sequence is a sequence that matches all sequence rules defined for all atoms contained in the sequence.

Boolean Constants

The first two enumerated atom constants are the Boolean values true and false. The enumeration and group rules for these constants are:

[E00] ZFalse:=U+EC00
[E01] ZTrue:=U+EC01
[G15] Boolean:=ZFalse|ZTrue

Boolean Arrays

The ZBoolArray atom prefixes a DataArray atom to form a BoolArray sequence. The DataArray atom encodes an array of Boolean constants [ZFalse, ZTrue] of size N, where N ranges from 0 to 0xFFFFFFFF.

The enumeration and sequence rules for this atom are:
[E02] ZBoolArray:=U+EC02
[S1] BoolArray:=ZBoolArray DataArray Repeat Atom The ZRepeat atom prefixes an Unsigned atom to form a Repeat sequence. The Unsigned encodes a repetition count for the following single atom value. This atom can be used to run-length encode value sequences of most atom types.

The enumeration and sequence rules for this atom are:
[E03] ZRepeat:=U+EC03
[S2] Repeat:=ZRepeat Unsigned
[S3] RepeatSequence:=Repeat (FixedPrecision|VariablePrecision|TextCode|Boolean)

Status Atoms

Status atoms are used to report device or program status and operational errors "in-band" within an atom sequence. The ZStatus atom prefixes an Uns8 atom to form a standard status code indication. The Uns8 atom value matches the corresponding constant used for "out-of-band" numeric status indications presented to an application. The ZStatus atom also prefixes an Uns32, CodeArray, TextArray or DataArray atom to form a device or program defined status "event" indication.

The atom enumeration rule and sequence rules are:
[E04] ZStatus:=U+EC04
[S4] StatusCode:=ZStatus Uns8
[S5] StatusEvent:=ZStatus (Uns32|CodeArray|TextArray|DataArray)

General Status Conditions

The status conditions defined here are common to most devices and programs, and can occur during the operations of a codec, sequencer or application of almost any design.

The status constant and atom sequence rules for these conditions are:

[S6] ZSuccess:=U+0
Success:=ZStatus U+E000
An operation completed as requested without internal or external errors.
[S7] ZFailure:=U+1
Failure:=ZStatus U+E001

An operation failed as requested without internal errors, indicating a Boolean "false" result.

[S8] ZWarning:=U+2
Warning:=ZStatus U+E002

An operation completed as requested; however, internal or external errors may have occurred that can degrade or halt the device or program operation.

[S9] ZInternalError:=U+3
InternalError:=ZStatus U+E003

An operation failed due to an internal error; however, normal operation can continue without restarting the device or program.

[S10] ZCriticalError:=U+4
CriticalError:=ZStatus U+E004

An operation failed due to an internal error that requires the device or program to be restarted before normal operation can continue.

Atom Processing Errors

The error conditions defined here are specific to the atom processing, and can occur during the operations of a codec, sequencer or application of any design. These errors indicate the failure of an atom encode, decode or match operation.

The error constant and atom sequence rules for these errors are:

[S11] ZAccessError:=U+5
AccessError:=ZStatus U+E005

A storage stream memory access failure was detected.

[S12] ZBytesError:=U+6
BytesError:=ZStatus U+E006

A storage stream with the wrong byte ordering was detected.

[S13] ZCodonError:=U+7
CodonError:=ZStatus U+E007

An ill-formed code unit sequence was detected.

[S14] ZDataError:=U+8
DataError:=ZStatus U+E008

An atom with a missing DataCode codon was detected.

[S15] ZIndexError:=U+9
RangeError:=ZStatus U+E009

An array atom element index exceeding the array size was detected.

[S16] ZLengthError:=U+A
LengthError:=ZStatus U+E00A

An atom encoding length exceeding the available storage was detected.

[S17] ZSizeError:=U+B
SizeError:=ZStatus U+E00B

A variable precision or array atom with and invalid or unexpected size tag was detected.

[S18] ZTextError:=U+C
TextError:=ZStatus U+E00C

An atom with a missing TextCode codon was detected.

[S19] ZTypeError:=U+D
TypeError:=ZStatus U+E00D

An atom of an invalid or unexpected type was detected.

CharArray Atom

The ZCharArray atom prefixes an Unsigned atom followed by an Uns8Array atom to form a sequence encoding a single or multiple byte coded character array of size N, from to 0xFFFFFFFF bytes. A Uns8 atom specifies one of the enumerated character sets defined in this section. A Uns16 or Uns32 atom specifies either a 2 character or 3 character ISO 639 alpha-code language identifier [ISO 639].

Uns16 atoms encode an ISO 639 alpha-2 code with the leading character in the upper byte and the trailing character in the lower byte of the 16-bit value. No other use of the Uns16 atom is defined for this atom sequence.

Uns32 atoms encode an ISO 639 alpha-3 code with the code characters mapped from the leading to trailing character in the $3^{rd}$ to $1^{st}$ bytes of the 32-bit value, respectively. Uns32 atoms may also be used to encode traditional manufacturer defined code page assignments as values greater than 0xFFFFFF.

The enumeration and sequence rules for these atoms are:

[E05] ZCharArray:=U+EC05
[S20] CharArray:=ZCharArray (Uns8|Uns16|Uns32) Uns8Array Enumerated Character Sets The character sets specified by an Uns8 atom of a CharArray atom sequence are enumerated in this document with hexadecimal [P] tags starting at zero. Undefined values are reserved for future definition based upon user requests and such is contemplated as being within the scope of the present method.

[P0] ZUSASCII:=U+E000 The 7-bit characters [U+00, U+7F].

USASCII character strings can be encoded as CharArray's using UTF-16 codons with an efficiency of 75%, compared to the 50% efficiency of a direct UTF-16 encoding.

Tagged Atom Sequences

Tagged atom sequences are the basic building block for encoding application schema elements, providing the essential nested structuring mechanism common to almost all applications.

[D10] A regular-structured atom sequence is a sequence that does not contain overlapping tagged sequences that are not also nested.

StartTag and StopTag Atoms

The ZStart and ZStop atoms prefix a Text atom to form the StartTag or StopTag primary sequences that bound an interior sequence of atoms. A StartTag matches the next StopTag in the atom sequence with the same Text atom size and value, allowing pure string comparisons for tag matches.

The enumeration and sequence rules for these atoms are:

[E06] ZStart:=U+EC06
[S21] StartTag:=ZStart Text
[E07] ZStop:=U+EC07
[S22] StopTag:=ZStop Text
[S23] TaggedSequence:=ZStart $Text_N$ ZAtom*ZStop $Text_N$ where $Text_N$ is a specific size and value.

[D11] An atom sequence fragment is a sequence that contains an incomplete primary sequence or an unmatched Start-Tag or StopTag sequence.

The use of explicitly matched StartTag-StopTag pairs allows faster sequence parsing, provides a basis for identifying tagged sequences, and enables the use of overlapping, un-nested tagged sequences.

Schema Atoms

Schema atoms enable applications to define and encode logical relationships among atoms and atom sequences using a common set of constructs, providing a basis for shared application schema.

Identifier Atom

The ZIdentifier atom prefixes a Text atom to form a label or nametag for the following atom or tagged atom sequence. Identifiers may be reused within an atom sequence.

The enumeration and sequence rules for this atom are:

[E08] ZIdentifier:=U+EC08
[S24] Identifier:=ZIdentifier Text
[S25] Identification:=Identifier (ZAtom|TaggedSequence)

Present encoding method ID Identifier Sequence

Identifiers with a TextCode sequence containing "Base3z" are reserved for use only as defined in this specification. The root form of all such Identifiers is:

[S26] Present encoding method ID:=ZIdentifier U+EC08 "Present encoding method" U+EC00.

Entity Atom

The ZEntity atom prefixes a Text atom to form a unique identification tag for the following atom or tagged atom sequence. Entities are required to be unique within an atom sequence.

The enumeration and sequence rules for this atom are:
[E09] ZEntity:=U+EC09
[S27] Entity:=ZEntity Text (ZAtom|TaggedSequence)

Reference Atom

The ZReference atom prefixes a Text atom to form a reference to the Entity tag with the same Text atom size and value, allowing pure string comparisons for tag matches.

The enumeration and sequence rules for this atom are:
[E0A] ZReference:=U+EC0A
[S28] Reference:=ZReference Text Class Atom The ZClass atom prefixes an Identifier or Entity sequence to form a membership characteristic of the following atom or tagged atom sequence. A class definition or singleton is identified using an Entity sequence. Instances of the class are identified using an Identifier sequence.

The enumeration and sequence rules for this atom are:
[E0B] ZClass:=U+EC0B
[S29] Class:=ZClass Identifier (ZAtom|TaggedSequence) |=ZClass Entity Attribute Atom The ZAttribute atom prefixes an Identifier sequence and the following atom, tagged atom sequence or Reference sequence to form an extrinsic characteristic of the nearest enclosing tagged atom sequence, or the otherwise unenclosed atom sequence. The attribute is inherited by nested tagged atom sequences that do not contain an instance of the same attribute.

The enumeration and sequence rules for this atom are:
[E0C] ZAttribute:=U+EC0C
[S30] Attribute:=ZAttribute Identifier (ZAtom|TaggedSequence|Reference)

[0194] Property Atom

The ZProperty atom prefixes an Identifier sequence and the following atom, tagged atom sequence or Reference sequence to form an intrinsic characteristic of the nearest enclosing tagged atom sequence, or the otherwise unenclosed atom sequence. The attribute is inherited by nested tagged atom sequences that do not contain an instance of the same attribute.

The enumeration and sequence rules for this atom are:
[E0D] ZProperty:=U+EC0D
[S31] Property:=ZProperty Identifier (ZAtom|TaggedSequence|Reference)

Physical Structure Atoms

Physical structure atoms prefix Integer and Unsigned atoms to form sequences that define specific Unicode encoding form storage distances between atoms, and between atoms and un-encoded storage regions. These atom sequences enable very efficient navigation of structured data-text information while the structure sizes are constant. Structure editing operations and encoding form conversions of atom sequences containing these prefix atoms may require updates to the inter-atom distances specified by these atom sequences.

Bridge Atom

The ZBridge atom prefixes an Integer atom to form a Bridge sequence. The Integer encodes a distance measured in bytes from the Bridge sequence that contains un-encoded binary data. A positive distance references a storage location after the Integer atom. A negative distance references a storage location before the ZBridge atom.

Binary data alignment is implemented by the application using leading. Null codons or trailing zero bytes as necessary. The storage content following the Bridge span is application dependent. Bridges can be used to mix spans of Unicode code points with binary data in the same storage region in a structured manner.

The enumeration and sequence rules for this atom are:
[E0E] ZBridge:=U+EC0E
[S32] Bridge:=ZBridge (Int8|Int16|Int32|Int64)

Link Atom

The ZLink atom prefixes an Integer atom to form a Link sequence. The Integer encodes the distance measured in code units from the ZLink atom to an atom or codon within the same atom sequence. A positive distance references a codon after the Link. A negative distance references a codon before the Link. A distance of zero is a self-reference.

The enumeration and sequence rules for this atom are:
[E0F] ZLink:=U+EC0F
[S33] Link:=ZLink (Int8|Int16|Int32|Int64)

System Atoms

System atoms prefix an Identifier atom followed by an optional atom or tagged atom sequence to form a device or program defined version, license or profile identifier. The ZCodeID Identifier is used to define the present encoding method system atom sequences.

Version Atom

The enumeration and sequence rules for this atom are:
[E10] ZVersion:=U+EC10
[S34] Version:=ZVersion Identifier ZAtom?

Present encoding method Specification Version Sequences

The present encoding method specification version identifies the major, minor and revision numbers as elements of an Uns8Array or Uns16Array. The atom sequence is of the form:
[S35] Present encoding method Version:=ZVersion ZCodeID (Uns8Array|Uns16Array)

License Atom

The enumeration and sequence rules for this atom are:
[E11] ZLicense:=U+EC11
[S36] License:=ZLicense Identifier ZAtom?

Present encoding method License Grant Sequences

A license grant atom sequence is of the form:
[S37] Present encoding method License:=ZLicense ZCodeID Uns32Array Profile Atom The Profile atom encapsulates as set of capabilities supported or required by a particular codec, sequencer or application. Standard profile components specify atom types, array sizes and sequences. Custom profile components can be specified by devices and programs as required.

The enumeration and sequence rules for this atom are:
[E12] ZProfile:=U+EC12
[S38] Profile:=ZProfile Identifier (ZAtom|TaggedSequence)?

Present encoding method Standard Profile Sequences

Present encoding method standard profiles specify the atom types required, preferred or supported by a program or device. These profiles are enumerated by an Uns8 constant followed by a DataArray containing a set of type constants in ascending order.

Array type constants imply the full value range by default. Array type size limits are specified by appending an Uns16 or Uns32 atom value to the type constant. Variable precision types are specified by enumerating each type-size constant.

Enumerated atoms can be specified as individual type codes, or as the ZFalse atom (U+EC00) followed by an Uns32Array of 8 elements with the corresponding bit set for each Enum atom included in the profile set. The array indexes the 256 Enum types in ascending element and bit order. Standard profiles do not specify User atom types.

The atom sequence is of the form:

[S39] Present encoding method Profile:=ZProfile ZCodeID Uns8 DataArray

The standard profile constants defined in this specification are:

[S40] ZRequired:=U+E001

The DataArray specifies the set of atom types required by the device or program.

[S41] ZPreferred:=U+E002

The DataArray specifies the set of atom types preferred by the device or program.

[S42] ZSupported:=U+E003

The DataArray specifies the set of atom types supported by the device or program.

Reserved Atoms

Enumerated atoms in this range are reserved for future assignment.

[E13] ZReserved:=U+EC13
[S43] Reserved:=[ZReserved-U+EDFF]

Notation

The formal grammar of the present encoding method used in this specification is presented here as a simple Extended Backus-Naur Form (EBNF) style notation. The grammar terminal symbols are the set of all code point values defined in the Unicode Standard, represented as:

U+NNNNNN where N is a hexadecimal digit corresponding to a 4-bit "nibble" of a code point value in the range from 0 to 10FFFF hexadecimal inclusively. Leading zeros are insignificant. Lower case characters are used as wildcard symbols to define a range of code point values, as in:

U+E0nn which represents the code point range U+E000 to U+E0FF inclusively.

Each rule of the grammar defines a symbol for an expression that matches a sequence of one or more Unicode code points, in the form:

symbol:=expression

A defined symbol may be used in a subsequent symbol definition expression.

Alias expressions define symbols beginning with a "Z" prefix that represent specific single code point values, as in:

ZNull:=U+0000

Range expressions define symbols representing any single code point value within a numeric range inclusively, as in:

[U+0000-U+FFFF]

Sequence expressions define symbols representing a sequence of one or more code point values using the following set of primitive expressions:

A? represents zero or one instance of the symbol A.

A* represents zero or more instances of the symbol A.

A+ represents one or more instances of the symbol A.

A{#} represents an exact number (#) of instances of the symbol A specified by a numeric constant or algebraic formula.

A B represents the symbol A followed by the symbol B.

A|B represents the symbol A or B, but not both.

(X) represents the (sub)expression X as a single symbol. No other operator precedence rule is defined.

Large or complex rules may be expressed incrementally using the construction form:

symbol:=expression1

|=expression2 which is equivalent to:

symbol:=(expression1)|(expression2)

Technical Notes

Present Encoding Method Design Considerations

Fixed Length vs. Variable Length Encoding

The encoding length of a numeric scalar value is a constant for each scalar type, while the encoding length of a numeric array is a constant plus a linear function of the array type and size. These properties enable extremely fast storage calculations for non-TextCode atoms, and indexed access to individual vector elements. Variable length encoding methods do not allow these features.

Variable length integer byte-wise encoding using a single continuation-bit per byte provides a limiting storage efficiency equal to 7 of 8 bits, or 87.5%. However, the set of well-formed Unicode UTF-8 byte sequences does not include all possible byte sequences, forcing an optimal UTF-8 based variable length encoding scheme to use the 7-bit code unit range U+00 to U+7F. The limiting storage efficiency is thus reduced to 6 of 8 bits, or 75%.

Private-Use Areas: Basic Multilingual Plane vs. Planes 15 and 16

The present encoding method uses a 4096 private-use code point block starting at U+E000 in the Basic Multilingual Plane (zero) to encode binary data in 12-bit units. The limiting storage efficiency of this encoding depends upon the Unicode encoding form used to represent these code points as follows:

| | |
|---|---|
| 12 data bits/(3*8-bit code units)=50% | UTF-8 |
| 12 data bits/(1*16-bit code unit)=75% | UTF-16 |
| 12 data bits/(1*32-bit code unit)=37.5% | UTF-32 |

Scalar values with power of two bit-sizes leave either 4 or 8 encoding bits unused for data that are used to encode the value type. Vector type and size information is encoded as either 12 or 24 bits to complete a data type system that, except for the trailing element in 2 of every 3 vectors, achieves otherwise perfect bit utilization.

An alternate encoding method can be designed using either of the Unicode private-use areas starting at U+F0000 or at U+100000, planes 15 and 16. The optimal use of one of these 64-K code point blocks is to encode 16-bits of binary data as a member of the block, yielding a limiting efficiency for each Unicode encoding form as follows:

| | |
|---|---|
| 16 data bits/(4*8-bit code units)=50% | UTF-8 |
| 16 data bits/(2*16-bit code units)=50% | UTF-16 |
| 16 data bits/(1*32-bit code unit)=50% | UTF-32 |

The maximum efficiency is only 50%, compared with 75% for the present encoding method UTF-16 encoding.

Adding type information further reduces the encoding efficiency for power of two scalar types.

Using the last 2 code points of these blocks for inter-application information transfers is generally forbidden by the Unicode Specification.

Alternate Encoding Blocks in the BMP Private-Use Area

The 4096 code point block used for the present encoding method could be located at any starting code point from U+E000 to U+E900. This start value would be added to each 12-bits of data during encode operations and subtracted during decode operations. The performance of software codecs would be nearly the same using this alternative as the OR/AND method used with the U+E000 starting value.

A hardware codec can be implemented for the U+E000 block by simply shifting data bits and inserting or deleting the bit pattern "1110" during register save and load operations without the additional gates for arithmetic operations required with other block locations. The effective processing overhead of the present encoding method encoding approaches zero when encoding and decoding takes place during store and load operations, making the minimum hardware solution a compelling design choice.

The use of alternate encoding blocks would require applications to exchange the block location at the atom sequence or application session level in a standardized manner to be generally useful, leaving U+E000 as the default block location. Such a feature may be included in a future embodiment of the present encoding method specification if needed and such is contemplated as being within the scope of the present method.

UTF-8 vs. UTF-16 Encoding

The relative merits of UTF-8 and UTF-16 encoding of text characters have been debated since the introduction of UTF-8 in 1993 as a means to allow existing byte-oriented I/O systems and string processing libraries to handle the Unicode character database with little or no modification.

The present encoding method defines text and data atoms as Unicode code point sequences. The set of all valid atom encodings, excluding CodeArray atoms, is identical for the UTF-8 and UTF-16 encoding forms. However, the encoding of data as U+Exxx code points requires these additional considerations in the selection of a Unicode encoding form:

The distribution of code points to be processed, stored or transferred by an application will be shifted toward the U+E000 to U+EFFF code block as more atoms are used. A UTF-8 encoding requires 3 bytes for these code points, while UTF-16 requires only 2 bytes.

The speed of data encode and decode operations is significantly higher using UTF-16 code units; generally, more than double the UTF-8 performance.

Fully optimized software codecs are very easy to write for UTF-16 encodings. The following C-language code illustrates encoding and decoding a 32-bit unsigned integer directly to and from UTF-16 code units:

```
                    void EncodeUns32(chr16* codeUnits, uns32 value)
  { *codeUnits++ = ZUns32 | (value >> 24);
    *codeUnits++ = ZData | ((value >> 12) & 0x0FFF);
    *codeUnits++ = ZData | (value & 0x0FFF);
  }
void DecodeUns32(chr16* codeUnits, uns32& value)
{ value = (uns32)*codeUnits++ << 24;
  value |= (uns32)(*codeUnits++ & 0x0FFF) << 12;
  value |= (uns32)*codeUnits++ & 0x0FFF;
}
```

Conversion between UTF-8 and UTF-16 streams can be very fast using table based methods.

Many application designs can be optimized by using UTF-16 encodings internally while supporting UTF-8 based external interfaces when necessary using conversion.

Present Encoding Method Codec Design Patterns

The primary considerations in the design of codecs include: memory resource limits and access patterns, encoding and decoding performance, support for atom types and array sizes, error handling methods, and support for Unicode encoding forms.

Memory constraints are often dominant. Processing fixed precision atom types requires very small memory windows or buffers to maximize performance, and works well with both random access and sequential access storage models. In contrast, array atom storage sizes can easily exceed the available buffer RAM in small devices, for which stream-based processing techniques become necessary.

A well-designed codec or sequencer should be capable of detecting all encoding and decoding errors, and reporting those errors to an application, where error handling logic is generally better positioned. When encoded data is processed entirely within a closed set of applications, performance can be improved by validating array type and size information only, avoiding repeated DataCode or TextCode codon testing for element access.

Support for multiple Unicode encoding forms can be achieved with a minimum of code development by generalizing atom processing as code points in one layer, and processing code points as a specific encoding form in another layer. However, this approach leaves room for large performance improvements using UTF-8 or UTF-16 optimized codecs.

A common design pattern used for processing structured documents and data serialized as text is the multiple data (atom) type, storage stream based reader, writer or editor. These relatively complex components generally process complete grammars used to build large application schemas. Applications often use both compilation and scripting of program logic to control these components. An alternative design pattern is the use of single type atom handlers bound to fixed storage locations where specific atom types are encoded and/or decoded. The handler constructors verify an existing atom or initialize a new atom at the storage location, throwing exceptions for invalid pointers and encoding errors. These handlers can be used to build structures of atom handlers analogous to C-language data structures.

REFERENCES

Normative

IEEE STD 754—Institute of Electrical and Electronic Engineers, Inc. The IEEE Standard for Floating-Point Arithmetic [online]. IEEE Std 754. New York, N.Y., 2008. [retrieved on 2010-08-11] Retrieved from the Internet: <URL: http://standards.ieee.org>.

ISO 639-International Standards Organization. International Standard, Codes for the representation of names of languages [online]. ISO 639, 2006. [retrieved on 2010-08-11] Retrieved from the Internet: <URL: http://www.loc.gov/standards/iso639-2/> and <URL: http://www.sil.org/iso639-3/>.

Unicode—The Unicode Consortium. The Unicode Standard, Version 5.0, defined by: The Unicode Standard 5.0 [online] .Addison-Wesley, Boston, Mass., 2007 (ISBN 0-321-48091-0) Retrieved from the Internet: <URL: http://www.unicode.org/unicode/standard/versions>.

Informative

IETF RFC 4648-S. Josefsson. IETF RFC 4648: The Base16, Base32, and Base64 Data Encodings [online]. The Internet Society, 2006. [retrieved on 2010-08-11] Retrieved from the Internet: <URL: http://tools.ietf.org/rfc/rfc4648.txt>.

W3C XML 1.0-Bray, T. and Paoli, J. Extensible Markup Language (XML) 1.0 Fifth Edition [online]. World Wide Web Consortium, 2008. [retrieved on 2010-08-11] Retrieved from the Internet: <URL: http://www.w3.org/TR/xml/>.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A computer readable storage medium containing one or more instructions, which when executed by a computer performs encoding of at least one binary data value as a sequence of Unicode code points, said code points occupying the Private Use Area of the Unicode Basic Multilingual Plane;

said encoding instructions using one or more bits of the first code point or code points of each sequence as an identification tag, each tag identifying both the type of data encoded and the length of the data encoded;

said sequence mapping data values to code points using Big-Endian (BE) or Little-Endian (LE) bit ordering; and said encoding comprising one of the following:

a. the construction of a Unicode code point as the mathematical "OR" of the constant E000 hexadecimal with a 12-bit data value from 0 to FFF hexadecimal;
said code points occupying the Unicode Basic Multilingual Plane in the range from E000 to EFFF hexadecimal;
the decoding of the original data value as the Boolean "AND" of the code point with the constant FFF hexadecimal; or b. the construction of a Unicode code point as the mathematical "addition" of a fixed constant in the range E000 to E900 hexadecimal with a 12-bit data value from 0 to FFF hexadecimal;
said code points occupying the Unicode Basic Multilingual Plane in the range from E000 to F8FF hexadecimal;
the decoding of the original data value as the mathematical "subtraction" of the same fixed constant from the code point.

2. The computer readable storage medium of claim 1, wherein said tag identifies at least one of single 8, 16, 32, 64 and 128 bit signed and unsigned integers or arrays thereof.

3. The computer readable storage medium of claim 1, wherein said tag identifies at least one of single 32, 64 and 128 binary and decimal floating point numbers or arrays thereof.

4. The computer readable storage medium of claim 1, wherein said tag identifies at least one of UTF-8, UTF-16 or UTF-32 code units or arrays thereof.

5. The computer readable storage medium of claim 1, wherein said tag identifies at least one of variable precision signed and unsigned integers, binary and decimal floating point numbers or arrays thereof.

6. The computer readable storage medium of claim 1, wherein said tag identifies any of a binary code decimal string value, a bit-string (array), or binary data objects (blobs) of any content.

7. The computer readable storage medium of claim 1, wherein said tag identifies at least one of an enumerated constant value.

8. The computer readable storage medium of claim 7, wherein said enumerated constant value being one of a True, False or a user-defined value.

9. The computer readable storage medium of claim 1, wherein said encoding and decoding is accomplished by one of a hardware or software codec.

10. In a computer system, a computer readable storage medium containing one or more instructions for performing a method for character encoding and decoding:

said method comprising translating a source data into a sequence of Unicode code points occupying the Private Use Area of the Unicode Basic Multilingual Plane, said method comprising;

using one or more bits of the first code point or code points of each sequence as an identification tag, each tag identifying both the type of data encoded and the length of the data encoded; said encoding method comprising one of the following methods:

a. the construction of a Unicode code point as the mathematical "OR" of the constant E000 hexadecimal with a 12-bit data value from 0 to FFF hexadecimal;
said code points occupying the Unicode Basic Multilingual Plane in the range from E000 to EFFF hexadecimal;
the decoding of the original data value as the Boolean "AND" of the code point with the constant FFF hexadecimal; or b. the construction of a Unicode code point as the mathematical "addition" of a fixed constant in the range E000 to E900 hexadecimal with a 12-bit data value from 0 to FFF hexadecimal;
said code points occupying the Unicode Basic Multilingual Plane in the range from E000 to F8FF hexadecimal;
the decoding of the original data value as the mathematical "subtraction" of the same fixed constant from the code point.

11. The method of claim 10, wherein said sequence mapping data values to code points using Big-Endian (BE) or Little-Endian (LE) bit ordering.

12. The method of claim 10, wherein said tag identifies at least one of single 8, 16, 32, 64 and 128 bit signed and unsigned integers or arrays thereof.

13. The method of claim 10, wherein said tag identifies at least one of single 32, 64 and 128 binary and decimal floating point numbers or arrays thereof.

14. The method of claim 10, wherein said tag identifies at least one of UTF-8, UTF-16 or UTF-32 code units or arrays thereof.

15. The method of claim 10, wherein said tag identifies at least one of variable precision signed and unsigned integers, binary and decimal floating point numbers or arrays thereof.

16. The method of claim 10, wherein said tag identifies any of a binary code decimal string value, a bit-string (array), or binary data objects (blobs) of any content.

17. The method of claim 10, wherein said tag identifies at least one of an enumerated constant value.

18. The method of claim 17, wherein said enumerated constant value being one of a True, False or a user-defined value.

19. The method of claim 10, wherein said encoding and decoding is accomplished by one of a hardware or software codec.

20. In a computer system, a method of encoding binary data as a sequence of Unicode code points occupying the Private Use Area of the Unicode Basic Multilingual Plane, said encoding comprising one of the following methods:

a. the construction of a Unicode code point as the mathematical "OR" of the constant E000 hexadecimal with a 12-bit data value from 0 to FFF hexadecimal;

said code points occupying the Unicode Basic Multilingual Plane in the range from E000 to EFFF hexadecimal;

the decoding of the original data value as the Boolean "AND" of the code point with the constant FFF hexadecimal; or b. the construction of a Unicode code point as the mathematical "addition" of a fixed constant in the range E000 to E900 hexadecimal with a 12-bit data value from 0 to FFF hexadecimal;

said code points occupying the Unicode Basic Multilingual Plane in the range from E000 to F8FF hexadecimal;

the decoding of the original data value as the mathematical "subtraction" of the same fixed constant from the code point.

* * * * *